US011070586B2

(12) United States Patent
Andrews

(10) Patent No.: US 11,070,586 B2
(45) Date of Patent: Jul. 20, 2021

(54) CRYPTOGRAPHIC NETWORK PROTOCOL ESCALATION PATH

(71) Applicant: Stackpath, LLC, Dallas, TX (US)

(72) Inventor: Bradley Michael Andrews, Maitland, FL (US)

(73) Assignee: Stackpath, LLC, Dallas, TX (US)

(*) Notice: Subject to any disclaimer, the term of this patent is extended or adjusted under 35 U.S.C. 154(b) by 439 days.

(21) Appl. No.: 15/863,477

(22) Filed: Jan. 5, 2018

(65) Prior Publication Data
US 2018/0198818 A1 Jul. 12, 2018

Related U.S. Application Data

(60) Provisional application No. 62/443,546, filed on Jan. 6, 2017.

(51) Int. Cl.
| | | |
|---|---|---|
| *H04L 29/06* | (2006.01) | |
| *H04L 9/06* | (2006.01) | |
| *H04L 12/26* | (2006.01) | |
| *H04L 29/08* | (2006.01) | |
| *H04L 9/32* | (2006.01) | |

(52) U.S. Cl.
CPC ........ *H04L 63/1458* (2013.01); *H04L 9/0637* (2013.01); *H04L 9/3239* (2013.01); *H04L 43/0888* (2013.01); *H04L 63/1425* (2013.01); *H04L 65/80* (2013.01); *H04L 67/02* (2013.01); *H04L 67/10* (2013.01); *H04L 67/12* (2013.01); *H04L 67/22* (2013.01); *H04L 67/42* (2013.01); *H04L 69/22* (2013.01);
(Continued)

(58) Field of Classification Search
CPC . H04L 65/605; H04L 65/1063; H04L 65/105; H04N 21/237; H04N 21/239; H04N 21/2351
See application file for complete search history.

(56) References Cited

U.S. PATENT DOCUMENTS

2002/0129162 A1* 9/2002 McGregor ............ H04L 67/306
709/238
2007/0091884 A1* 4/2007 Wee ........................ H04L 67/10
370/389

FOREIGN PATENT DOCUMENTS

WO WO 02/49278 6/2002

OTHER PUBLICATIONS

Ari Juels et al. "Client Puzzles: A Cryptographic Countermeasure Against Connection Depletion Attacks" NDSS 1999 (15 pages) (Year: 1999).*

(Continued)

*Primary Examiner* — Joseph P Hirl
*Assistant Examiner* — Thomas A Gyorfi
(74) *Attorney, Agent, or Firm* — Knobbe, Martens, Olson & Bear LLP

(57) ABSTRACT

The systems and methods described herein can provide a protocol escalation path in response to a client system's request or in response to a triggering event. For example, the computing system can provide an indication to a client system that the client system can upgrade from a regular connection channel to an upgraded connection channel if the client system can solve a certain proof-of-work. The computing system may also receive a request from the client system to access an upgraded connection channel. The upgraded connection channel may provide more bandwidth, stability, higher priority, etc., alone or in combination, comparing to the regular connection channel.

23 Claims, 7 Drawing Sheets

(52) U.S. Cl.
CPC ...... *H04L 2209/38* (2013.01); *H04L 2209/56* (2013.01); *H04L 2463/141* (2013.01)

(56) References Cited

OTHER PUBLICATIONS

Gaetano Carlucci et al. "HTTP over UDP: an Experimental Investigation of QUIC" SAC '15: Proceedings of the 30th Annual ACM Symposium on Applied Computing, Apr. 2015 (pp. 609-614) (Year: 2015).*
International Search Report and Written Opinion for PCT/US2018/012638, dated May 17, 2018, 23 pages.
Juels et al., "Client Puzzles: A Cryptographic Countermeasure Against Connection Depletion Attacks," Jan. 1, 1999.
Striegel et al. "A scalable QoS adaptation scheme for media servers," Proceedings 15th International Parallel and Distributed Processing Symposium, IPDPS 2001 (2001): 1045-1052.
Wang et al., "Defending against denial-of-service attacks with puzzle auctions," IEEE Symposium on Security and Privacy, 78-92, May 11-14, 2003.

\* cited by examiner

CRYPTOGRAPHIC NETWORK PROTOCOL ESCALATION PATH

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present disclosure relates to computer networks.

BACKGROUND

A computing system of a content provider may experience a sudden increase in network traffic. For example, a denial-of-service (DoS) attack can flood the network with useless traffic. As another example, a distributed DoS (DDoS) attack can cause multiple malicious systems to flood the bandwidth or resources of a target system.

SUMMARY

In certain embodiments, systems and methods described herein can provide a protocol escalation path in response to a client system's request or in response to a triggering event. For example, the computing system can provide an indication to a client system that the client system can upgrade from a regular connection channel to an upgraded connection channel if the client system can solve a certain proof-of-work. The computing system may also receive a request from the client system to access an upgraded connection channel. The upgraded connection channel may provide more bandwidth, stability, higher priority, etc., alone or in combination, comparing to the regular connection channel.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

DETAILED DESCRIPTION

Overview

Figure 1:
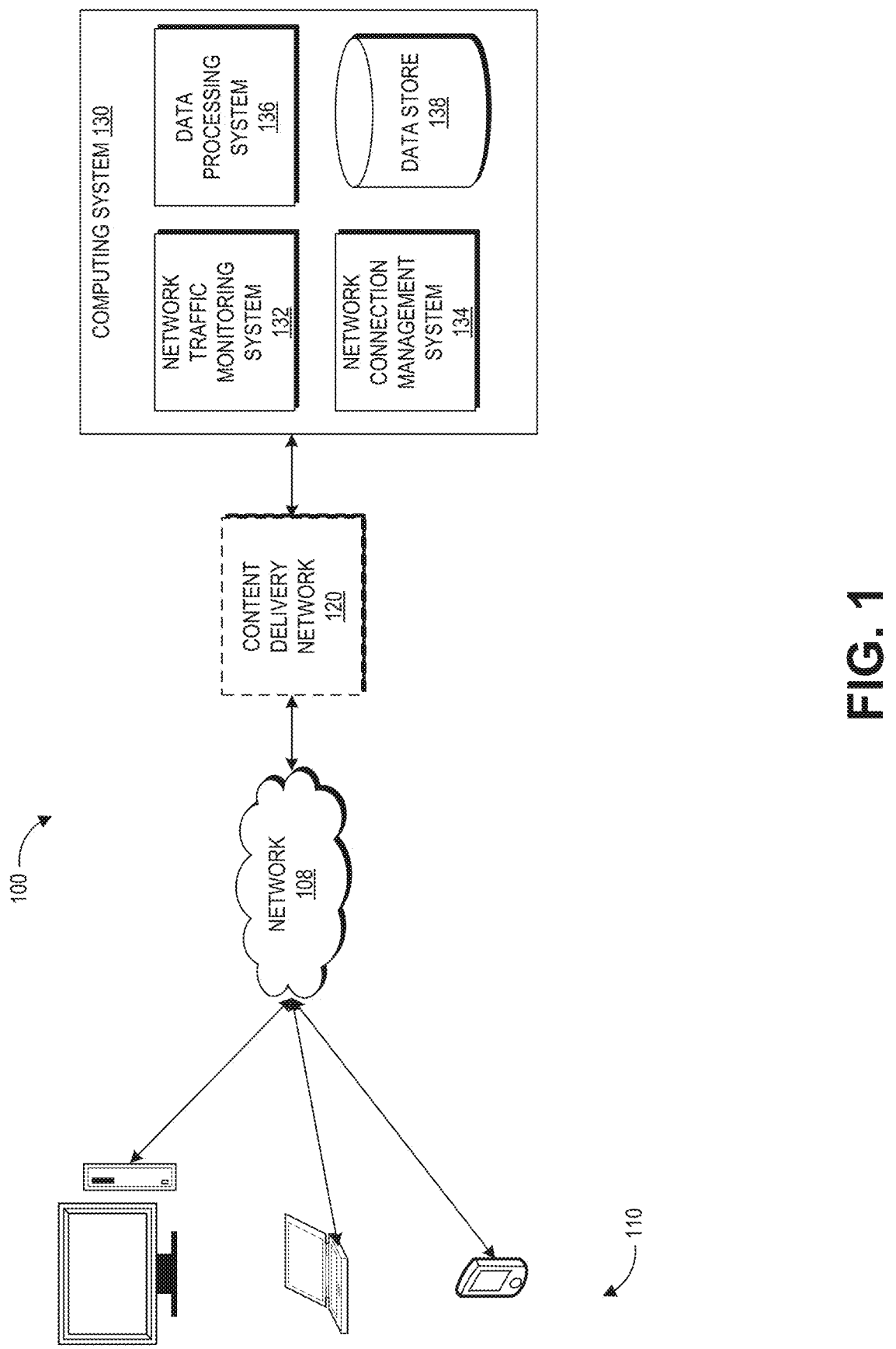
FIG. 1 depicts an example computing environment for providing a network protocol escalation path.

A computing system may experience a sudden increase in network traffic. For example, during a DoS or DDoS attack (collectively referred to herein as "DoS" attacks), the computing system may be flooded by useless traffic and therefore not have enough resources to respond to legitimate requests for content. To defeat the DoS attack, the computing system may attempt to overwhelm the malicious system. However, the malicious system may be continuously taking over more computing devices and can quickly outnumber devices associated with the computer system. For example, the malicious system can take over any computing device, including internet of things (IoT) devices, and use those devices for the DoS attack. IoT devices may include physical devices other than typical computers (such as thermostats, robotic vacuum cleaners, appliances, etc., rather than laptops, PCs, phones, and so on), vehicles, buildings, or other items, embedded with electronics, software, sensors, or actuators, as well as network connectivity that enable these objects to collect and exchange data. Some IoT devices may be low powered devices. Due to the number of IoT devices that may connect to a network, sometimes the network connection for a computing device may be slowed down as the low powered devices occupy more network bandwidth (e.g., in a DoS attack). To avoid being paralyzed by the increased number of network requests, the computer system may deny the incoming network requests. But this approach denies both the malicious requests and the legitimate requests.

As another example, the computing system may experience an increase in the number of requests to a video when the video suddenly becomes popular. However, the computing system may not have enough resources to handle the increased number of requests. As a result, the computing system may deny the incoming requests even though these requests are legitimate, which may cause dissatisfaction of network users.

To differentiate the legitimate requests from the malicious requests or to otherwise prioritize legitimate requests, the computing system may provide protocol escalation paths for the legitimate requests. The computing system may provide an indication that the client system can upgrade from a regular connection channel to an upgraded connection channel if the client system can use its hardware resources to perform certain processing. For example, the computing system may request the client system to solve a mathematical or computational problem, such as a proof-of-work. A proof-of-work may be a math problem associated with a cryptocurrency (e.g., Bitcoin, Ethereum, Zcash, Auroracoin, etc.), such as computing a hash function of a blockchain associated with the cryptocurrency. The proof-of-work can also be based on other types of computational problems. As such, the proof-of-work can be part of a distributed computing problem. For example, the proof-of work may include a computational problem associated with a distributed protein folding project (e.g, Folding@home), a computational problem associated with a project that analyzes antenna data for extraterrestrial intelligence (e.g., SETI@home), or other types of resource intensive computations where verifying the solution of the problem can be done more easily than solving the problem. As another example, the proof-of-work may involve finding a prime number or solving other mathematical, programming, or gaming problems (e.g., chess engine tweaking, such as the Stockfish™ Fishtest program) using distributed computing. Thus, the proof-of-work may relate to an altruistic value or a monetary value.

Advantageously, in certain embodiments by requiring a client system to solve the proof-of-work, the computing system can distinguish a legitimate request from a malicious request because the malicious system will unlikely process the proof-of-work, since the processing costs the malicious system's computing resources and electricity. Some IoT devices (such as a thermostat) may not even have enough hardware resources to process the proof-of-work, which means that those systems may no longer be able to continue their role in the DoS attack.

In some embodiments, a client system may request to connect to the upgraded connection channel by volunteering to solve one or more proofs-of-work even though there is no sudden surge in network traffic. In certain implementations, a proof-of-work is broken down into smaller segments. The client system may be configured to work on a segment of the proof-of-work.

The upgraded connection channel may provide more bandwidth, stability, higher priority, etc., alone or in combination, as comparing to a regular connection channel. In the event of a sudden surge of the network traffic, the computing system may dedicate more computing resources to the upgraded connection channel and deny incoming traffic on the regular connection channel.

To cover the cost of delivering content via the upgraded connection channel, the computing system may associate a value with the proof-of-work. Accordingly, the value earned by solving the proof-of-work may be used by the client system to obtain access to the upgraded connection channel. For example, the value may be a reward gained from mining a cryptocurrency such as Bitcoin, Zcash, Auroracoin, etc. An example of bitcoin is further described in "Bitcoin: A Peer-to-Peer Electronic Cash System" by Satoshi Nakamoto (2008) ("Nakamoto"), the disclosure of which is hereby incorporated by reference in its entirety. Any of the cryptocurrency features described herein, including computing proofs-of-work, can use any of the features of Nakamoto, among other currently-available cryptocurrency technologies. In certain implementations, the value of earned by solving the proof-of-work may be based on the complexity of the proof-of-work. For example, solving a more complex problem may gain more value than solving a simpler problem.

In addition to or in alternative to ameliorating the effect of a DoS attack, providing a protocol escalation path can also be useful for distinguishing the type of client systems that connect to the computing system. For example, the connection cost may be set to a high level, e.g., by providing a difficult proof-of-work to solve, to inhibit connections by low powered devices (such as some IoT devices) that likely would only connect in a DoS attack). Because the low powered devices may not have enough computing resources to process the proof-of-work, the low powered devices may not have access to the upgraded connection channel. For the devices that chose more expensive connections by solving the proofs-of-work, the computing system can provide a higher level of network service. As another example, a user of a computing device may choose to use the upgraded connection channel by solving the proof-of-work.

The techniques described herein may also be useful for deprecating legacy protocols. For example, if a client system chooses to process the proofs-of-work, the client system may be granted access to a new protocol. Gradually, as more client systems migrate to the new protocol, the legal protocols may become overwhelmed by garbage internet of things traffic and be deprecated.

Example System for Providing a Network Protocol Escalation Path

FIG. 1 depicts an example of a computing environment for providing a network protocol escalation path. The network 108 can be a radio network, a cellular network, the Internet, a local area network ("LAN"), a wide area network ("WAN"), or any similar network using any protocol now known or developed in the future. The client system can communicate with the computing system 130 to obtain content, such as a webpage, mobile application data, or audio/video content.

The example computing environment 100 includes a client system 110 and a computing system 130. The client system 110 can communicate with the computing system 130 via the network 108. The client system 110 can obtain content from the computing system 130 and/or request a protocol escalation path by communicating with the computing system 130. For example, the client system 110 can send an indication to the computing system 130 informing the computing system 130 that the client system 110 would like to use an upgraded connection. The indication may be sent as a request for upgrading or as a reply to a request from the computing system 130.

In some embodiments, the client system 110 is in communication with a content delivery network (CDN) 120 via the network 108 to obtain web content. The CDN can include a plurality of edge servers which can host content and deliver the content to end users. For example, the client system 110 can stream a video via an edge server of the CDN 120. The CDN can be in communication with the computing system 130. In certain implementations, the computing system 130 (or a portion of the computing system 130) may be implemented by a CDN edge server. The CDN 120 may also be part of the computing system 130. Additional details of a CDN, any portion of which may be implemented by the CDN 120, are described in the U.S. Pat. No. 8,200,810, the disclosure which is hereby incorporated herein in its entirety.

The example computing system 130 shown includes a network traffic monitoring system 132, a network connection management system 134, a data processing system 136, and a data store 138. Although some examples of the computing system 130 are described with reference to a CDN, the computing system 130 may be implemented across a variety of environments. For example, the computing system 130 may be implemented on one or more application servers associated with a medical facility, a telephone company, etc. The computing system 130 as implemented on these application servers may be configured to support real-time operations, such as accessing medical records or conducting a call over a network (e.g., voice over IP). The computing system 130 may also be part of a cloud computing environment that includes virtualized servers. Although the network traffic monitoring system 132, the network connection management system 134, the data processing system 136, and the data store 138 of the computing system 130 are illustrated as separate systems in the computing environment 100, in some embodiments, one or more of these systems may be part of a single system, and one or more of the components shown may be omitted in some embodiments. Additional details on the computing system 130 are further described below.

Network Traffic Monitoring System

The network traffic monitoring system 132 can be configured to monitor hardware resources of the computing system 130 and/or the content delivery network 120. For example, the network traffic monitoring system 132 can monitor the bandwidth (such as, e.g., the outbound or inbound bandwidth), throughput (or peak throughput), the CPU utilization of the computing system 130, random access memory (RAM) utilization, hard drive capacity utilization, hard disk I/O utilization, or other hardware resources. The network traffic monitoring system 130 can also monitor the availability of one or more servers (such as, e.g., whether an edge server is down), the availability of hardware resources of the one or more servers, the number of open connections, etc., in the CDN 120. Additionally or alternatively, the network traffic monitoring system 132 can monitor information associated with incoming requests. For example, the network traffic monitoring system 132 can monitor how many requests a CDN server receives during a certain period of time (such as, e.g., 10 seconds, 60 seconds, 10 minutes, 1 hour, etc.). The network traffic monitoring system 132 can also look at information associated with the computing devices making such requests. For example, the network traffic monitoring system 132 can review the geographical regions associated with the requests. In certain implementations, the network traffic monitoring system looks at the type of a device making the request, such as whether the device is a personal computer, a mobile phone, or a thermostat (or other IoT devices). This information can be used by the network traffic monitoring system 132 to detect an increase in the network traffic or a DoS attack.

The network traffic monitoring system 132 can calculate one or more metrics associated with the network conditions. The one or more metrics may be based on the utilization of the hardware resources (also referred to herein as hardware utilization). The metrics may include the CPU utilization rate, random access memory (RAM) utilization rate, hard drive capacity utilization rate, hard disk I/O utilization rate, the number of open connections, etc. The metrics may also include traffic deviation over time, such as, e.g., how much the network traffic fluctuates overtime, whether there is a sudden surge in the network traffic, etc. The traffic deviation over time may be calculated based on the hardware utilization. For example, the network traffic monitoring system 132 can calculate an average CPU utilization rate for a group of CDN edge servers or the CPU utilization rate over a period of time for a CDN edge server. The metric may also be calculated based on the bandwidth usage. For example, the network traffic monitoring system 132 can calculate a percentage utilization of the outbound bandwidth associated with a CDN edge server. As another example, the network traffic monitoring system 132 can calculate the throughput on a connection channel, such as, e.g., a regular connection channel or an upgraded connection channel. As yet another example, the network traffic monitoring system 132 can calculate a percentage utilization rate associated with the RAM or the hard drive to determine whether the RAM resources or the hard drive resources are approaching their limits.

The network traffic monitoring system 132 can calculate the efficiencies of the one or more servers associated with computing system 130 or the CDN 120. For example, the network traffic monitoring system 132 can calculate the bandwidth utilization efficiency of a CDN edge server. The network monitoring system 132 can calculate a percentage of net bitrate (in bit/s) of a connection channel that is associated with the observed throughput. If the throughput is 80% Mbit/s in a 100 Mbit/s connection, then the bandwidth utilization rate is 80%. Additionally or alternatively, the network traffic monitoring system 132 can calculate the deployed hardware utilization efficiency. The network traffic monitoring system 132 can calculate the minimum number of servers required for the peak load and divide this number by a total number of servers deployed to obtain the deployed hardware utilization efficiency.

The metrics may also be calculated based on incoming requests. For example, the network traffic monitoring system 132 can calculate the number of incoming requests per second. The network traffic monitoring system 132 can also calculate what percentage of the requests is made by a particular type of device (such as low powered IoT devices). The network traffic monitoring system 132 can also determine whether a geographical region is associated with large percentage of the incoming requests.

The metric may be calculated based on data related to multiple hardware resources. For example, the network traffic monitoring system 132 can calculate an overall hardware utilization rate based on the CPU utilization rate and the percentage of the bandwidth used.

The network traffic monitoring system 132 can compare a metric with a threshold condition. If the threshold condition is passed, the network traffic monitoring system 132 may send a notification to another system such as the client system 110, the content network delivery system 120, or the network connection management system 134, alone or in combination.

As an example, when the network traffic monitoring system 132 determines that 80% of the outbound bandwidth is currently used, the network traffic monitoring system 132 may determine that the outbound bandwidth utilization rate has exceed a high threshold. Accordingly, the network traffic monitoring system 132 may notify that network connection management system 134 that the network bandwidth utilization is approaching its limit. As further described herein, based on the notification from the network traffic monitoring system 132, the network connection management system 134 can take one or more actions to free up the bandwidth, such as by denying more incoming requests, downgrading some connections from an upgraded connection channel to a regular connection channel, closing one or more channels (such as, e.g., closing the regular connection channel), etc.

As another example, the network traffic monitoring system 132 may find that the percentage of CPU utilization of a server is below a threshold condition suggesting that the hardware resources may be insufficiently utilized. As a result, the network traffic monitoring system 132 can inform the network connection management system 134. The network connection management system 134 may route traffic from another server through the server whose hardware resources are insufficiently utilized.

The network traffic monitoring system 132 may use a combination of factors to determine what actions to take, such as, for example, what instructions should be sent to the network connection management system 134. For example, the network traffic monitoring system 132 may detect that the bandwidth utilization rate of a group of CDN servers has just exceeded 50% (or some other value). The network traffic monitoring system 132 may be configured not to take any actions because the bandwidth utilization rate itself is not high enough. However, if the network traffic monitoring system 132 also detects that over, e.g., 70% of the requests are sent by low powered IoT devices even though the bandwidth utilization rate is slightly over 50%, the network traffic monitoring system 132 may determine that a DoS attack is likely going to occur or escalate. As a result, the network traffic monitoring system 132 can send an alert to the network connection management system 134 which may cause the network connection management system 134 to reject more incoming requests or to require the client systems to process a proof-of-work before accessing the content supplied by the computing system 130. This may reduce the likelihood of the computing system 130 being paralyzed by a DoS attack.

A metric may be associated with multiple thresholds, where each threshold may trigger a certain action. For example, the network traffic monitoring system 132 can calculate an overall hardware utilization rate of a CDN server, which may be based on the CPU utilization rate and the bandwidth utilization rate of the CDN server. This overall hardware utilization rate may be compared to thresholds A, B, or C, where threshold A is associated with a high utilization rate, threshold B is associated with a medium utilization rate, and threshold C is associated with a low utilization rate. For example, if the overall hardware utilization rate is higher than threshold A, the network traffic monitoring system 132 may send an alert to the network connection management system causing the network connection management system 134 to reject incoming requests on a regular connection channel. If the overall hardware utilization rate is higher than threshold B but is lower than threshold A, the network traffic monitoring system 132 can notify the network connection management system 134 the overall hardware utilization rate. The notification may cause the network connection management system 134 to send indications to client systems that the upgraded connection is available. If the overall hardware utilization rate is lower than threshold C, the network traffic monitoring system 132 may be configured not to take any actions.

Network Connection Management System

The network connection management system 134 can manage network connections with the client system 110, such as when an upgraded connection channel should be provided to the client system 110 or which connection channels should be used for communication with the client system 110.

The network connection management system 134 can determine an appropriate connection channel based on the network conditions. For example, the network connection management system 134 can provide an upgraded connection channel to the client system 110 when the network traffic monitoring system 132 detects an increase in the network traffic. The network connection management system 134 can also start rejecting more traffic when the available hardware resources such as bandwidth or CPU resources, etc. are running low.

The upgraded connection channel may have a steadier or faster connection than a regular connection channel. For example, the network connection management system 134 may set aside a certain bandwidth or other hardware resources for an upgraded connection channel. In some embodiments, the upgraded connection channel is implemented using Hypertext Transfer Protocol (HTTP) over User Datagram Protocol (UDP). Using UDP instead of the Transmission Control Protocol (TCP) can avoid the connection overhead of TCP and the associated vulnerability to DoS attacks inherent in TCP (e.g., via TCP "SYN" packet flooding). The computing system 130 can also prioritize the communications associated with an upgraded connection channel over the communications via a regular connection channel. For example, when the computing system 130 experiences an increased traffic volume, the network connection management system 134 may allocate more hardware resources to the upgraded connection channels and reduce the amount of hardware sources spent on the regular connection channels. As an example, the network connection management system 134 may dedicate a larger percentage of bandwidth to the upgraded connection channels. In some embodiments, where the client system 110 communicates with virtualized servers in a cloud environment to access audio/visual content, the network connection management system 134 can provide scale up/down capacity for delivering the content. For example, when the computing system 130 experiences an surge in incoming requests, the network connection management system 134 can obtain, for the computing system 130, more hardware resources (such as RAM, CPU, etc.) in the cloud environment. As another example, when the computing system 130 experiences a drop in the traffic, the network connection management system 134 can reduce the amount of hardware resources, such as by closing one or more virtualized server instances.

The network connection management system 134 can communicate with a client system 100 indicating that an upgraded connection channel is available when the connection between the computing system 130 and the client system 110 is first established (such as during the handshake or in the first few messages after the handshake). For example, the network connection management system 134 can include the availability of the upgraded connection channel in a header of one of the communications protocols (e.g., an HTTP header, a TCP header, etc.). When the client system 110 receives the indication that the upgraded connection channel is available, the client system 110 can indicate in the reply that it would like to use the upgraded connection channel. This process can be transparent to the user or involve user input, as described in more detail below.

The network connection management system 134 can provide a proof-of-work to the client system 110 to process. The network connection management system 134 can access the data processing system 136 or the data store 138 to retrieve the proof-of-work and communicate the proof-of-work to the client system 110. The network connection system 134 can also provide a location for retrieving the proof-of-work to the client system 110. In some situations, the computing system 130 (such as the data processing system 136) can unbundle the proof-of-work into smaller segments and require the client system 110 to process a segment of the proof-of-work (rather than the whole proof-of-work). This implementation can allow the client system 110 to complete processing within a reasonable amount of time.

Upon obtaining the proof-of-work from the location, the client system 110 can process the proof-of-work to find a solution of the proof-of-work. For example, the client system 110 can compute a cryptographic hash as described in Nakamoto, and communicate the result of the processing to the network connection management system 134. The network connection management system 134 can validate the result received from the client system 110.

For example, the network connection management system 134 may request the client system 110 to generate a cryptographic hash which meets certain criteria. The criteria may be that the value of the hash must be less than a threshold value. Upon receiving the result from the client system 110, the network connection management system 134 can determine whether the value of the hash in the result is indeed less than the threshold value. The criteria may also be based on the characteristics in the cryptographic hash. For example, the criteria may be that the string of hash must start with leading zeros (such as "000"). Accordingly, the network connection management system 134 can validate the result by looking at the leading characters of the cryptographic hash.

Although the examples described herein are with reference to the client system 110 solving a proof-of-work, in some embodiments, the client system 110 may receive a requirement for generating a proof-of-work. The client system 110 can accordingly generate a result associated with the proof-of-work based on the requirement.

In some embodiments, the network connection management system 134 instructs the data processing system 136 to provide a proof-of-work to the client system 110, receive the result of the processing from the client system 110, or validate the result, alone or in combination. If the result is valid, the computing system 130 can allow the client system 110 to access the upgraded connection channel. If the result is not valid or if the client system does not provide a result to the proof-of-work, the communication between the computing system 130 and the client system 110 can take place via the regular connection channel. If the regular connection channel is under DoS attack, the system 134 may halt or throttle communication on that channel.

In some implementations, the network connection system 134 can provide the proof-of-work to the client system 110 together with an indication that an upgraded connection channel is available. The network connection system 134 can upgrade connection with the client system 110 if the network connection system 134 receives a valid result of the proof-of-work from the client system 110.

If the client system 110 is not interested in the upgraded connection, the client system 110 can ignore the information related to upgrade in the header file or can explicitly refuse in the reply. The computing system 130 and the client system 110 can communicate with each other via the regular connection channel—assuming it is even available in the event of an attack—even though the upgraded connection channel is not used. Thus, some users may choose to forgo the cost of using the upgraded channel at the risk of not being able to use a channel at all, while other users may elect to participate in the upgraded channel if and when it is made available.

In addition to or in alternative to enabling a client system to access the upgraded connection channel via solving proof(s)-of-work, in certain implementations, the network connection management system 134 can allow the client system to access the upgraded connection channel based on the device characteristics of the client system. For example, the network connection management system 134 can analyze a group of client devices having similar characteristics, such as, e.g., blocks of IP address, types of devices, headers associated with user agents (such as, e.g., a browser or other software that is acting on behalf of a user to communicate with the computing system 130), etc. The network connection management system 134 can further determine whether one or more client devices in the group of client devices have solved proof(s)-of-work. If so, the network connection management system 134 can allow another client device within the same group of the client device to access the upgraded connection channel without requiring the other client device to solve a proof-of-work. The network connection management system 134 can use various techniques (such as, e.g., applying a probabilistic model) to determine which client device within the group of client devices can access the upgraded connection channel without solving a proof-of-work. The network connection management system 134 can use a sampling technique to identify a client device eligible for upgrade. For example, the network connection management system 134 can select every nth client device to access the upgraded connection channel where such client devices have the same block of IP address with a client device which already solved the proof-of-work. By allowing a client device to exploit the benefit of another client device's work, the workload of the computing system 130 may be significantly reduced and a client device may be able to gain access to the upgraded connection channel faster. As further described below with reference to FIG. 5, the network connection management system 134 can also block a client device having similar characteristics with a group of client devices on a blacklist where such client devices are likely to be low-powered IoT devices, compromised devices, or devices which have refused to solve a proof-of-work.

In some embodiments, even though the computing system 130 has allowed the client system 110 to access the upgraded connection channel, the communications between the computing system 130 and the client system 110 may still take place on the regular connection channel unless a certain network condition occurs. For example, the computing system 130 and the client system 110 may communicate with each other using the regular connection channel until the network traffic monitoring system 132 detects a surge in the volume of the network traffic. Then the computing system 130 may notify the client system 110 and change the connection channel to the upgraded connection channel.

The computing system 130 can receive an indication from the client system 110 that the client system 110 is capable of handling the upgraded connection. As an example, the client system 110 may automatically include a request to upgrade to the upgraded connection channel when the connection is first established. The network connection management system 134 can respond to the request with a proof-of-work. If the result to the proof-of-work provided by the client system 110 is valid, the network connection management system 134 can enable the client system 110 to access the upgraded connection channel.

The computing system 130 may ignore the client's request and communicate with client system 110 using the regular connection channel. In some embodiments, even though the computing system 130 ignores the client system's 110 request, the computing system 130 may store the information that the client system 110 is willing to connect using the upgraded connection. When a certain network condition occurs, the computing system 130 may respond with a proof-of-work or allow the client system 110 to access the upgraded connection channel. If the network condition does not occur, the computing system 130 and the client system 110 can communicate with each other using the regular connection channel despite that the computing system 130 has indicated the availability of the upgraded connection channel or that the client system 110 has expressed the interest for using the upgraded connection channel. The computing system 130 may also automatically allow the client system 110 to access the upgraded connection channel if another client system with similar characteristics of the client system 110 has already solved proof(s)-of-work. The computing system 130 can maintain a whitelist of client devices. The whitelist can include client devices which have solved proof(s)-of-work. Accordingly, the computing system 130 can select the client system 110 for the upgraded connection channel if the client system 110 has one or more similar characteristics as the client devices on the whitelist despite that the client system 110 has not solved a proof-of-work. In certain implementations, the once the client system 110 is selected for the upgraded connection, the computing system 130 can automatically add the client system 110 to the whitelist. In addition to or in alternative to a whitelist, the computing system 130 can maintain a blacklist for devices which are not eligible for the upgraded connection channel. If the client system 110 has one or more similar characteristics as the devices on the blacklist, the upgraded connection channel may be automatically ineligible for the client system 110.

In certain implementations, the default connection channel between a computing system 130 and a client system 110 is the regular connection channel. The computing system 130 may provide an indication that an upgraded connection channel is available in response to a network condition (such as, for example, a surge in the network traffic) or in response to a client system's request. In other implementations, the default connection channel between the computing system 130 and the client system 110 is the upgraded connection channel. For example, the computing system 130 may identify the client system 110 as the one that requires the upgraded connection channel when it first receives a connection request from the client system 110. As further described with respect to the client system 110, the client system 110 may include an application which can provide an indication to the computing system 130 that the default connection with the client system 110 is the upgraded connection or that the client system 110 is configured to connect via the upgraded connection.

In some embodiments, the computing system 130 offers multiple types of upgraded connection channels. These types of upgraded connection channels and the regular connection channel may sometimes be referred to as tiers of service. For example, the computing system 130 can offer a regular connection channel, a tier 1 connection, a tier 2 connection, etc. The value of the proof-of-work and the type of connections associated with each tier of service may be different. For example, the regular connection channel may require no proof-of-work. The tier 2 connection may involve a proof-of-work with relatively less computing resources while the tier 1 connection may involve more computing resources to process a proof-of-work than tier 2. Accordingly, the tier 1 connection may have a faster speed or may have a higher priority than the tier 2 connection when the computing system 130 experiences a surge in network traffic. Additional details of providing multiple tiers of services are described below with reference to FIG. 4.

The metrics calculated by the network traffic monitoring system 132 may be used to determine which tier of service should be offered to the client system 110. For example, if the outbound bandwidth is greater than a threshold associated with tier 1 connection because a CDN edge server experiences a sudden increase of network traffic, the network connection management system 134 may indicate to the client system 110 that tier 1 connection channels (or better connection channels) are available. The network connection management system may also reduce the number of requests accepted on other lower tier connections (such as the regular connection channel or the first tier of the upgraded connection channel) while keep accepting network requests via the tier 1 connection. As another example, if the outbound bandwidth is greater than a threshold associated with the tier 2 connection but is less than the threshold associated with the tier 1 connection, the network connection management system 134 may provide both the tier 1 and the tier 2 connections as options to the client system 110. The client system 110 can pick either option for communication with the computing system 130.

An upgraded connection between the computing system 130 and the client system 110 may be timed. The duration of the upgraded connection may be predetermined. For example, the duration may be set to 5 minutes, 30 minutes, 1 hour, and so on. The duration may be set by the network connection management system 134 or by the data processing system 136. In some embodiments, the client system 110 extends the duration of the upgraded connection by solving additional proofs-of-work. For example, while the client system 110 is connected to the computing system 130, the client system 110 can continuously solve proofs-of-work. The client system 110 can continuously solve the proofs-of-work during the upgraded connection or during the regular connection. In some situations, the proofs-of-work solved in one online session may be used for an upgraded connection in the next online session with the computing system 130.

The duration of the upgraded connection may also be based on network conditions. For example, when the computing system 130 determines that the amount of network traffic has dropped, the computing system 130 may automatically change the connection channel for a client system 110 from the upgraded connection channel to the regular connection channel.

In some embodiments, the network connection management system 134 can provide a notification to a user of the client system 110 showing that the upgraded connection channel is available. The user may respond to the notification by accepting or rejecting the upgraded connection channel. The notification may also be sent when the upgraded connection has terminated.

Data Processing System

The data processing system 136 can determine which proof-of-work should be provided to a client system 110. The data processing system 136 can associate a value with a proof-of-work. For example, the value may be associated with the cost of delivering the upgraded network connection. In some embodiments, the proof-of-work is a blockchain problem associated with a cryptocurrency (such as, e.g., bitcoin or other virtual currencies). A number of cryptocurrencies may be rewarded if the blockchain problem is solved. The value of the cryptocurrencies obtained (due to solving the block-chain problem) may determine the duration of the upgraded network connection. For example, the value of the cryptocurrencies may be equivalent to or more than the cost of delivering the upgraded network connection. The value may also be based on the amount of computational resources consumed or the complexity of the proof-of-work. For example, a more computationally intensive calculation or a more complex problem may be associated with a higher value, whereas a less computationally intensive calculation or a less complicated problem may be associated with a lower value.

In some embodiments, a proof-of-work has multiple segments. The data processing system 136 can associate a value with each segment of the proof-of-work. Accordingly, the computing system 130 can provide a segment of the proof-of-work to a client system 110 and provide an upgraded connection channel based on the value of that segment.

The data processing system 136 can validate the result of a proof-of-work once the client system 110 processes the proof-of-work. As an example, the data processing system 136 can determine whether the solution to a math problem—such as, e.g., a cryptographic hash—is correct. As another example, the data processing system 136 can determine whether the result provided by the client system 110 corresponds to the proof-of-work provided, rather than a random string.

In some embodiments, the client system 110 continuously solves the proof-of-work as the client system 110 is connected to the computing system 130. The data processing system 136 can validate the client system's 110 results as the client system 110 generates them. In certain implementations, the client system 110 can process the proof-of-work while the client system 110 is not connected to the computing system 130. But when the client system 110 later establishes the connection with the computing system 130, the client system 110 may provide the results of the processing to the computing system 130.

Upon validating the results, the data processing system 136 can account for the value of the results with the proofs-of-work solved by the client system 110. The value may be used for upgraded connection during this online session or future connections. For example, the data processing system 136 (or another system) can provide the validated result to another computing system. The other computing system can reward the computing system 130 with a cryptocurrency, the value of which may be equal to the value of the proofs-of-work processed by the client system 110.

Data Store

The data store 138 may be configured to store proofs-of-work, valid results of the proofs-of-work, values corresponding to the respective proofs-of-work, information on client systems, one or more metrics associated with network conditions, thresholds associated with the one or more metrics, and so on, in combination or the like. The data store 138 may include one or more databases. The data store 138 may optionally be implemented in a distributed architecture.

The data store 138 may be in communication with the network traffic monitoring system 132, the network connection management system 134, or the data processing system 136, alone or in combination. For example, the data processing system 136 can retrieve from the data store 138 a value associated with a cryptocurrency as well as the proof-of-work used to obtain the cryptocurrency. As another example, the network traffic monitoring system 132 can store the monitored network traffic data in the data store 138.

In some embodiments, the data store 138 may be part of the CDN 120. Accordingly, the data store 138 may store the content (such as, e.g., audio or visual content) that will be delivered by a CDN server.

Client System

The client system 110 may be part of a client device such as a laptop, a desktop, a tablet, or a mobile device, or more generally, any device with a processor and input/output functionality. The client system 110 can be configured to communicate with the computing system 130 via a regular connection channel or an upgraded connection channel. For example, the client system 110 may receive an indication from the computing system 130 that an upgraded connection channel is available. The client system 110 may respond to the computing system 130 by indicating that it is interested in using the upgraded connection channel.

In some embodiments, the client system 110 includes an application which can support a protocol escalation path. The application may be part of another program on the client system 110. For example, the application may be a plug-in to a web browser. The application may also be a standalone application, such as a web browser or mobile application.

The application may send a request or a reply to the computing system 130 indicating that the client system 110 is willing to connect using the upgraded connection channel. For example, the application may modify or generate a portion of a network protocol header to include information that the client system 110 wants to connect using the upgraded connection channel. For example, the HTTP header may specify the protocol of connection (e.g., a regular v. an upgraded connection). Additionally or alternatively, the HTTP header may include a code (such as a number or an alpha-numerical string) indicating that the client system 110 would like to switch the connection channel from one to the other.

The process of the protocol escalation may be transparent to a user of the client system 110. For example, the user can set the setting of the application to allow the upgraded connection channel when it is available. The user can set the connection to the upgraded connection channel as automatic. Accordingly, if the client system 110 receives the indication from the computing system 130 that the upgraded connection channel is available, the client system can automatically switch to the upgraded connection channel, for example, by indicating in the network protocol header in a reply to the computing system 130. In some implementations, the client system 110 automatically begins to process a proof-of-work for accessing the upgraded connection channel.

The user of the client system 110 can also set the setting of the application such that the switching between the regular connection channel and the upgraded connection channel involves a user input. When an upgraded connection channel is available, the computing system 130 can send the indication which causes a notification to be displayed on the client system 110. For example, the indication may automatically trigger the application on the client system 110 to provide a notification (such as, e.g., via a popup window) to the user showing that the upgraded connection channel is available. The user can choose whether to upgrade by responding to the notification. As further described herein, the computing system 130 can be configured to offer different types of upgraded connections. The computing system 130 can allow a client system 110 to choose among these types of upgraded connections. For example, a user of the client system 110 may set a default connection to a tier 1 connection. The computing system 130 can also provide the user the options of the available types of upgraded connection via a notification. The user of the client system 110 can accordingly choose the desired option. For example, the user can make the choice based on the available hardware resources of the client system 110. The user can select a type of upgraded connection such that the client system 110 will have sufficient hardware resources to process the proof-of-work (or a segment of the proof-of-work) associated with the selected type of upgraded connection.

Server Initiated Protocol Escalation Examples

Figure 2A:
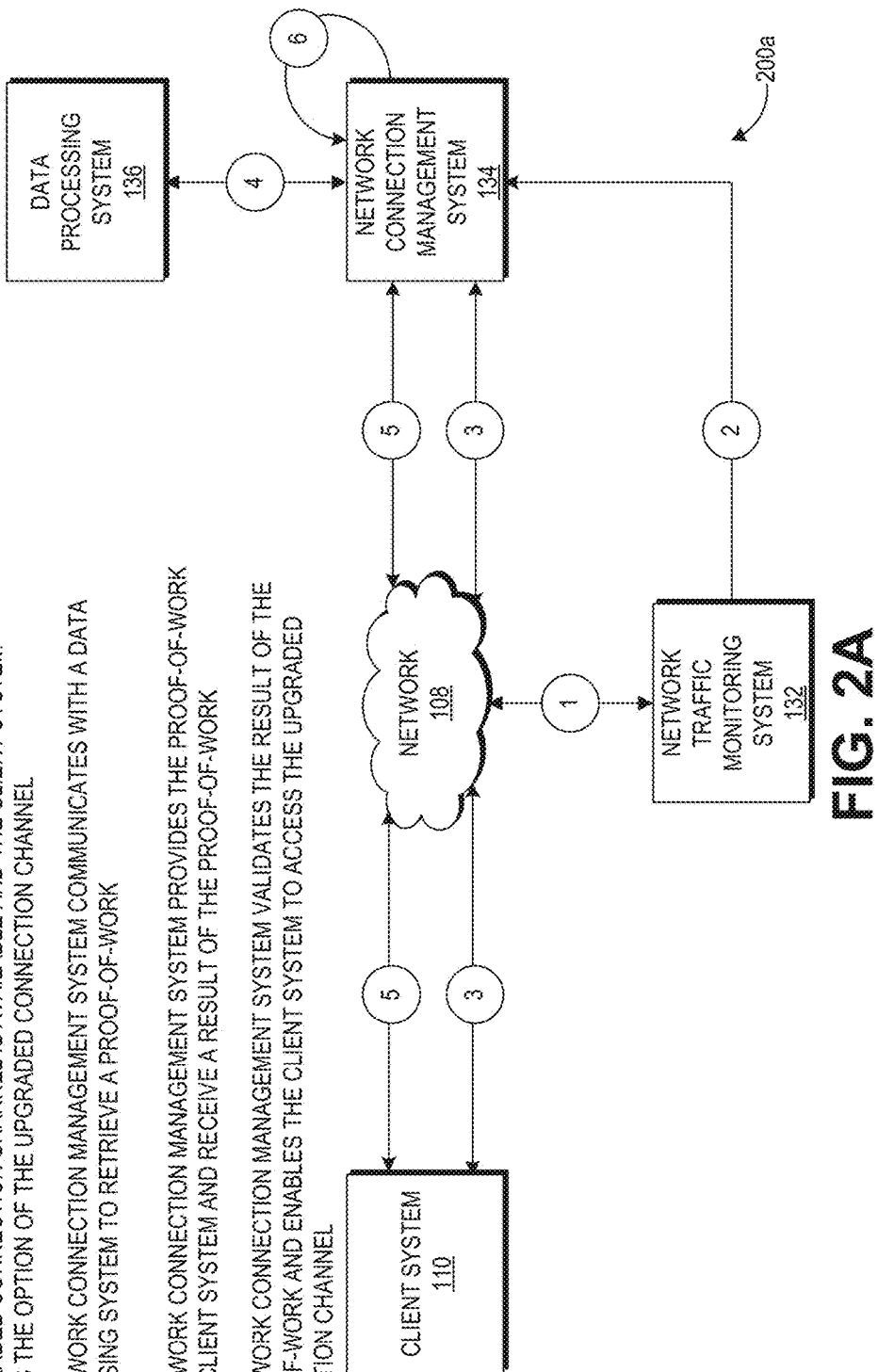
FIG. 2A depicts an example of a server initiated protocol escalation.

FIG. 2A depicts an example of a server initiated protocol escalation. The example computing environment 200a in FIG. 2A includes a client system 110, a network 108, a data processing system 136, a network connection management system 132, and a network traffic monitoring system 134. In some embodiments, the data processing system 136, the network connection management system 134, and the network traffic monitoring system 132 may be part of the computing system 130 shown in FIG. 1. In the computing environment 200a, the client system 110 may initially be connected to a CDN server or the computing system 130 via a regular connection channel.

At state (1), the network traffic monitoring system 132 can monitor network traffic. The network traffic monitoring system 132 can calculate one or more metrics associated with the network traffic. For example, the network traffic monitoring system 132 can calculate the outbound bandwidth utilization rate of a CDN server.

At state (2), the network traffic monitoring system 132 can notify the network connection management system 134 upon detecting a network anomaly. For example, the network traffic monitoring system 132 may detect a sudden surge in network traffic (for example, due to a DoS attack) based on the one or more metrics. The network traffic monitoring system 132 can send a notification to the network connection management system 134 if the one or more of the metrics passes a threshold condition. For example, if the bandwidth utilization rate or the CPU utilization rate of a CDN server exceeds a certain percentage, the network traffic monitoring system 132 may notify the network connection management system 134 that the CDN server is approaching its limit.

At state (3), the network connection management system 134 can inform a client system 110 that a protocol escalation is available. For example, the network connection management system 134 may indicate to the client system 110 that an upgraded connection channel is available in an HTTP header. The client system may respond, for example, in an HTTP header, that it selects the option of the upgraded connection. If the client does not respond to the network connection management system's 134 indication that the upgraded connection channel is available, the client system 110 can still communicate with the computing system 130 (or the CDN server) using the regular connection channel.

In some embodiments, in response to the detected network anomaly, the network connection management system 134 starts rejecting the connection requests from client systems if the client system does 110 not choose the upgraded connection channel.

At state (4), the network connection management system 134 can communicate with a data processing system 136 to retrieve a proof-of-work for the client system 110 to process. The data processing system 136 may provide the proof-of-work together with its associated value to the network connection management system 134.

At state (5), the network connection management system 134 can provide the proof-of-work to the client system 110. The client system 110 can process the proof-of-work and return the result to the network connection management system 134.

In certain implementations, the network connection management system 134 can communicate the proof-of-work together with the indication that an upgraded connection is available to the client system 110. The client system can indicate a selection of the upgraded connection by providing the result of the proof-of-work.

At state (6), the network connection management system 134 can validate the result of the proof-of-work. In come embodiments, the network connection system 134 can instruct the data processing system 136 to perform the validation. Once the network connection management system 134 determines that the result is valid, the network connection management system 134 can respond to the client system 110 and allow the client system 110 to access the upgraded connection channel. The upgraded connection may be implemented using HTTP over UDP. In some embodiments, the network connection management system 134 or the data processing system 136 may receive, as a reward, a cryptocurrency corresponding to the proof-of-work the client system 100 has solved. For example, where the proof-of-work is associated with Bitcoin mining, the reward received by the network connection management system 134 or the data processing system 136 may be a bitcoin or a smaller unit of the bitcoin (such as, e.g., millibitcoin, microbitcoin, satoshi, etc.).

Client Initiated Protocol Escalation Examples

Figure 2B:
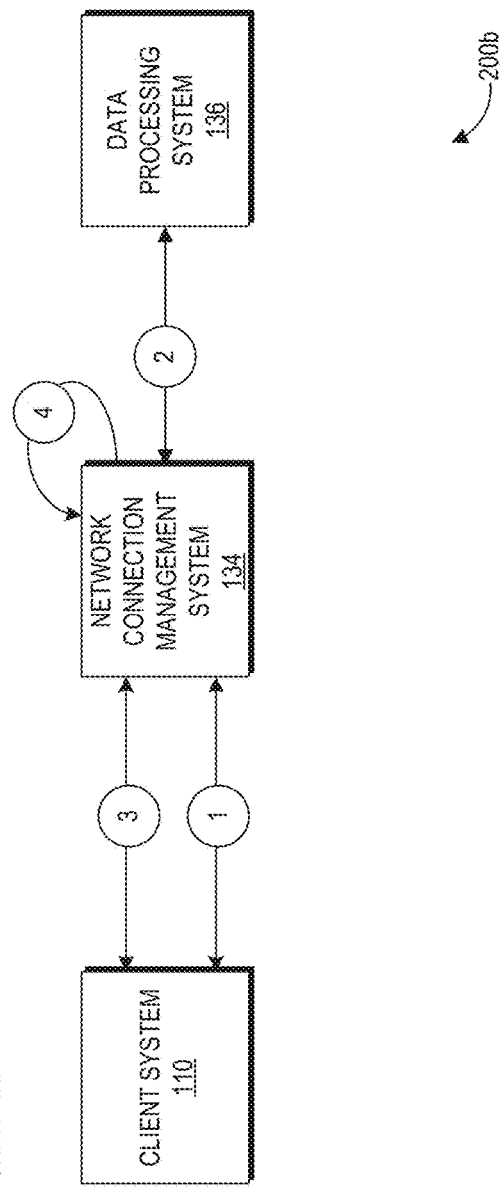
FIG. 2B depicts an example of a client initiated protocol escalation.

FIG. 2B depicts an example of a client initiated protocol escalation. The computing environment 200b in FIG. 2B includes a client system 110, a network connection management system 134, and a data processing system 136. The network connection management system 134 and the data processing system 136 may be part of the computing system 130 or be part of the CDN 120 shown in FIG. 1.

At state (1), a client system 110 can initiate a protocol escalation, for example, by requesting an upgraded connection. The client system 110 can make the request in an HTTP header.

At state (2), the network connection management system 134 can retrieve a proof-of-work from a data processing system 136. In some embodiments, the network connection management system 134 communicates with a data store to retrieve the proof-of-work. The proof-of-work may obtain a value associated with the proof-of work from the data processing system 136 or from the data store.

At state (3), the network connection management system 134 can provide the retrieved proof-of-work to the client system 134. The network connection management system 134 may also provide the value associated with the proof-of-work to the client system 110. In some embodiments, the network connection system 134 directs the data processing system 136 to communicate the proof-of-work (and its associated value) to the client system 110.

The client system 110 can process the proof-of-work and return the result of the proof-of work to the network connection management system 134. At state (4), the network connection management system 134 can validate the result of the proof-of-work. If the result is valid, the network connection management system 134 can enable the client system 110 to access an upgraded connection channel. For example, the network connection management system 134 can reply to the client system 110 using the upgraded connection channel after the proof-of-work is validated. Additionally or alternatively, the network connection management system 134 can provide a notification to the user of the client system 110 indicating that the client system 110 now has access to the upgraded connection channel. In certain implementations, the data processing system 136 may validate the result of the proof-of-work and inform the network connection management system 134 whether the result is valid.

If the result is not valid, the network connection management system 134 may resend the proof-of-work or send another proof-of-work for processing by the client system 110. In the meantime, the connection between the network connection management system 134 and the client system 110 may be via on a regular connection channel.

In some embodiments, the client system 110 may have received a proof-of-work in a previous online session with the network connection management system 134. The client system 110 can include the result of the proof-of-work with the request for the upgraded connection.

Example Processes for Providing a Protocol Escalation Path

Figure 3:
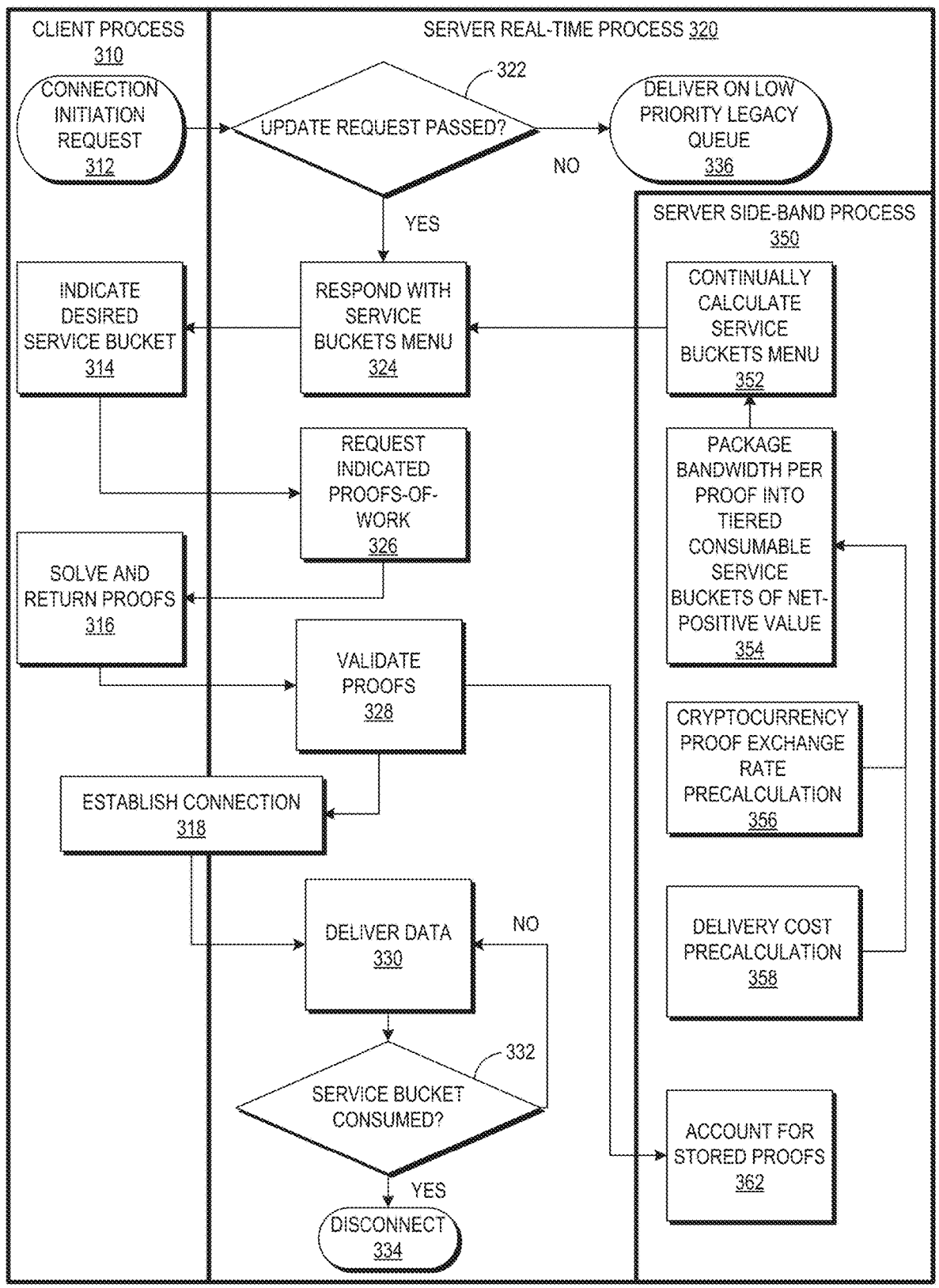
FIG. 3 depicts an example of providing a network protocol escalation path.

FIG. 3 depicts an example of providing a network protocol escalation path. The process 300 in FIG. 3 includes a client process 310, a server real-time process 320, and a server side-band process 350. The client process 310 may be implemented by the client system 110. The server real-time process 320 may be implemented by the network connection management system 134. The server side-band process 350 may be implemented by the data processing system 136.

At block 312, a client system can initiate a connection request. In the connection request, the client system can specify that it is willing to connect using an upgraded connection. For example, the client system can specify that it has computing resources to process proofs-of-work associated with the upgraded connection.

At block 322, a network connection management system 134 can parse the connection request. If the connection request does not indicate that the client is willing to connect using the upgraded connection or if the connection request does not mention anything about the upgraded connection, the network connection management system may communicate with the client system using a regular connection channel. For example, the network connection management system can instruct a CDN server to deliver content on a low priority legacy queue, such as, for example, on a regular connection channel.

If the connection request indicates that the client is willing to connect using the upgraded connection, at block 324 the network connection management system can respond with a list of available tiers of service (also referred to as a service buckets menu). Each tier of service may be associated with a type of upgraded connection. Services can be classified into different tiers based on the duration of connections, the bandwidth of the connections, the priorities associated with the connections, the total size of data that can be communicated or downloaded by the client system, etc., alone or in combination. For example, a connection channel may be associated with a tier 1 connection which may include 1 hour of upgraded connection with top 1 priority while another connection channel may be associated with a tier 2 connection, which may include (for example) 1 hour of upgraded connection with top 2 priority. If the client communicates with a CDN server using this connection channel while the CDN's hardware resources are approaching the limit, the CDN may nevertheless keep tier 1 connection but reject other connections with lower priorities (including the tier 2 connection). Each tier of connection may be associated with a complexity of a proof-of-work (or a segment of the proof-of-work). For example, an upgraded connection with a higher priority may be associated with a more complex proof-of-work which may require more computing resources to process. The service buckets menu may also specify computing resources required for solving the proofs-of-work associated with respective tiers of the upgraded connections.

The service buckets menu may be predetermined by a data processing system in the service side-band process 350. At block 358, the data processing system can calculate delivery costs associated with different tiers of services. The delivery costs may be the dollar costs that a network provider will charge a user of a client system. The delivery costs may also be associated with dollar amount for purchasing additional hardware resources in a cloud computing environment. At block 356, the data processing system can calculate an exchange rate between the proof-of-work and the cryptocurrency. For example, the data processing system may calculate how many proofs-of-work need to be solved for gaining 1 cryptocurrency. The exchange rate and the delivery costs calculated at blocks 356 and 358 respectively may be used to determine the value of an upgraded connection channel at block 354. For example, the data processing system can associate a tier of service or a bandwidth with proofs-of-work (or a number of proofs-of-work) that the client system needs to solve in order to obtain access to that tier of service. The data processing system may make the association such that the cost of delivering the service is less than the rewards gained for solving the proofs-of-work. At block 354, the data processing system can package the tiers of service and their associated values into a service buckets menu. At block 352, the service buckets menu may be continuously calculated as the delivery cost and the exchange rate may change. For example, if the network connection management system determines network congestions, the delivery cost may be increased dynamically. The service buckets menu may be communicated to a client system by the network connection system at block 324.

In certain implementations, the network connection management system can determine a type of the client system. For example, the network connection management system can determine whether the client device is a mobile device, a home computer, or a server. The network connection management system can provide the service buckets menu based on the type of the client system. For example, the network connection management system may return a service buckets menu with lower tier of services (which requires less processing power for solving the proofs-of-work) to the client system if the client system is a mobile device. On the other hand, the network connection management system may return a service buckets menu with higher tier of services (which requires more processing power for solving the proofs-of-work) if the client system is a home computer or a server. As another example, if the network connection management system determines that client system is a mobile device, the network connection system may move directly to block 336, because the client system may not be capable of handling the proofs-of-work required for the upgraded connection.

At block 314, the client system can select a desired service bucket. For example, the client system can select a duration of the upgraded connection. Additionally or alternatively, the client system can select a tier of service. In some embodiments, the client system makes such selections by reviewing its available computing resources. For example, it can determine how much CPU processing power it has available for solving the proofs-of-work. The client system can communicate the desired service bucket to the network connection management system.

At block 326, the network connection management can request the indicated proofs-of work. For example, the network connection management system can communicate with a data store to retrieve the proofs-of work. In some embodiments, if the upgraded connection selected by the client system includes multiple proofs-of-work or multiple segments in a proof-of-work, the network connection management system may first communicate a segment or a proof-of-work to the client system for processing and send one or more subsequent messages for other proofs-of-work or other segments of the proof-of-work.

At block 316, the client system can solve the proofs-of-work as received from the network connection management system and return the result of the proofs-of-work. In some embodiments, the client system returns the result of a segment of the proof-of-work while continuing to solve the rest of the segments. Additionally or alternatively, the client system can return the result of a proof-of-work while continuing to work on the solutions for the proofs-of-work.

At block 328, the network connection management system can validate the results of the proofs-of-work received from the client system. The network connection management system can validate the rest as it receives them. Accordingly, it may not need to receive the solutions of all proofs-of-work delegated to the client system before it starts the validation process.

The network connection management system can account for stored proofs-of-work at block 362. For example, the network connection management system can provide a portion of a proof-of-work to the client system while providing another portion to a different client system. If the result provided by the client system is correct, the network connection management system may communicate with the data processing system which can mark the portion provided to the client system as completed. In some embodiments, the data processing system stores the result of the proofs-of-work in the data store.

If the result provided by the client system is valid (e.g., the result provided by the client system meets certain criteria); the network connection management system can determine that the client system has earned the value associated with the assigned proof-of-work. Accordingly, at block 318, the network connection management system can establish a connection with the client system. The connection may be via an upgraded connection channel as selected by the client system.

At block 330, the network connection management system and the client system can communicate with each other using the upgraded connection channel. For example, the client system may download audio/video content from a CDN server using the upgraded connection channel. The client system can continuously deliver the results to other proofs-of-work as the client finishes processing them. In some embodiments, the network connection management system 134 provides additional proofs-of-work to the client system. If the client system can solve these additional proofs-of-work, the connection duration using the upgraded connection channel may be extended.

At block 332, the network connection management system can determine whether the service bucket is consumed. For example, the network connection management system can track the length of the connection and determine whether the duration is up. The network connection management system can also track total number of bytes delivered to the client system and determine whether it has reached the total size of data associated with the client system's connection.

If the service bucket is consumed, the network connection management system can disconnect from the client system. The client may need to perform block 312 to reestablish the connection. In some embodiments, the network connection management system downgrades the connection from the upgraded connection channel to a regular connection channel. To resume the access to the upgraded connection channel, the client system may need to inform the network connection management system again that it has the capacity to process proofs-of-work.

Figure 4A:
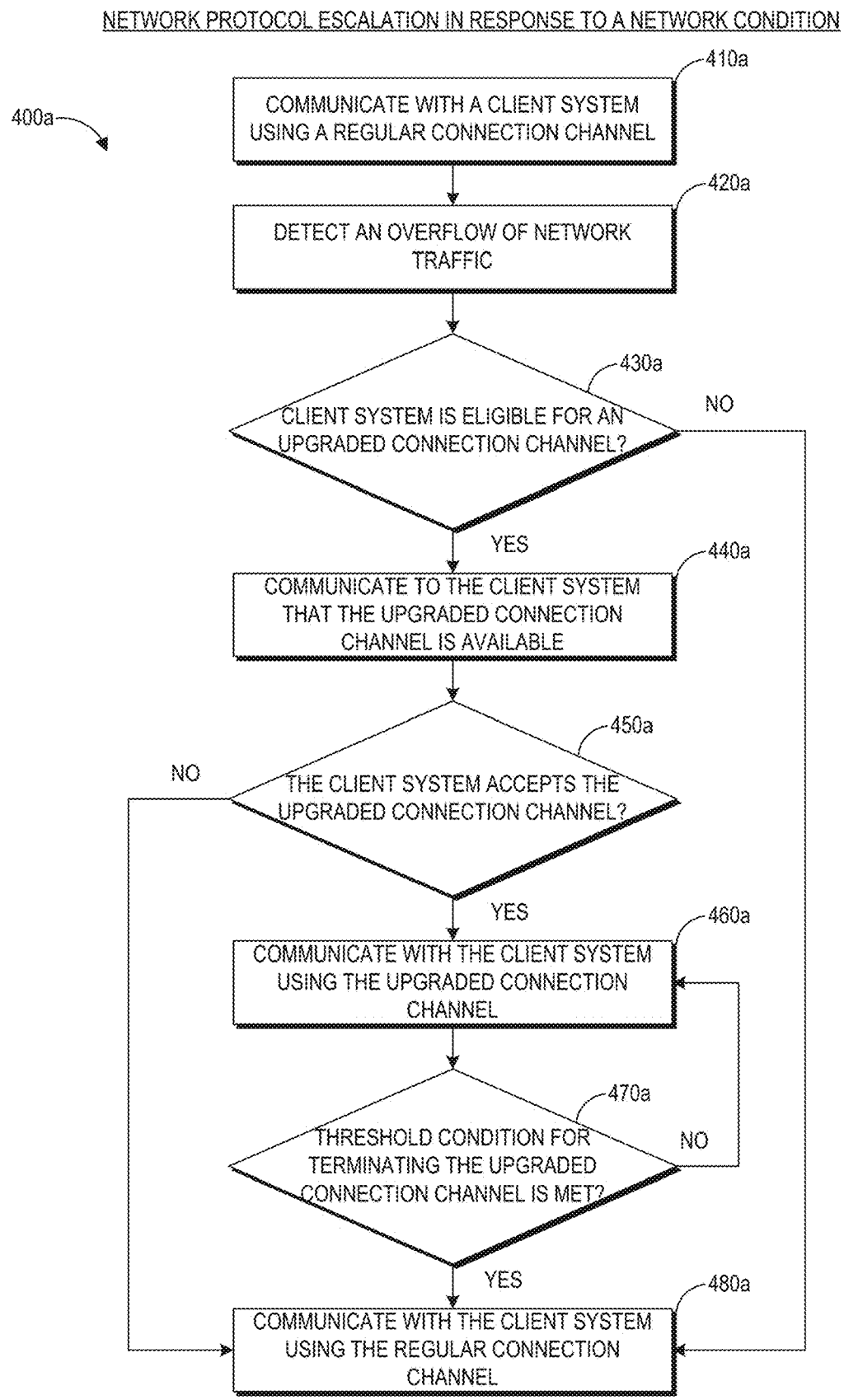
FIG. 4A depicts an example process for providing a network protocol escalation in response to a network condition.

FIG. 4A depicts an example process for providing a network protocol escalation in response to a network condition. The process 400*a* in FIG. 4A may be performed by the computing system 130 shown in FIG. 1.

At block 410*a*, the computing system can communicate with a client system using a regular connection channel. For example, a CDN server of the computing system can deliver audio or visual content to the client system using the regular connection channel.

The computing system can monitor the network conditions and detect a triggering event. The triggering event may be an overflow of the network traffic at block 420*a*. For example, the computing system can determine the utilization rate of its hardware sources, such as, e.g., the CPU utilization or bandwidth of its CDN servers. The triggering event may also include other network problems, such as, e.g., a detection of a DDoS attack, or may be a request from the client system for the upgraded connection.

At block 430*a*, the computing system can determine if the client system is eligible for an upgraded connection channel. For example, the computing system can determine the type of the client system, such as whether it's a mobile device or a home computer. If the computing system determines that the type of client system is not suited for the upgraded connection channel, the computing system may still communicate with the client system using the regular connection channel at block 480*a*. In some embodiments, the client system may provide an indication that it has the capacity to handle a certain amount of proofs-of-work in a previous message to the computing system. The computing system may store this information in a data store. When the computing device detects the overflow of the network traffic at block 420*a*, the computing system may identify the client system as the system eligible for upgrade based on the previous message.

If the computing system determines that the client system can connect the upgraded connection, at block 440*a*, the computing system can provide an indication to the client system that an upgraded connection channel is available. In some embodiments, the computing system provides a proof-of-work to the client system to solve. Advantageously, in some embodiments, by requiring the client system to solve a proof-of-work before accessing the upgraded connection channel, the computing system may filter out traffic that does not have a legitimate interest in the content delivered by the computing system.

At block 450*a*, the client system can accept the upgraded connection channel. For example, the client system may accept the upgraded connection channel by solving a proof-of-work provided by the client system. If the client system ignores the indication that the upgraded connection channel is available or if the client system declines the upgrade, the computing system and the client system may still communicate using the regular connection channel at block 480*a*.

At block 460*a*, the computing system and the client system can communicate using the upgraded connection channel after both parties have agreed to the upgraded connection. In some embodiments, the computing system validates the result of the proof-of-work as processed by the client system before allowing the client system to access the upgraded connection channel.

At block 470*a*, the computing system can determine whether a threshold condition for terminating the upgraded connection channel is met. For example, the computing system may only allow the client system to access the upgraded connection channel for a threshold period of time or only for transmitting a certain size of data. The threshold condition may also be based on the network conditions. For example, when the network traffic on the regular connection channel has dropped, the computing system may determine that the threshold condition for terminating the upgraded condition channel is met. If the threshold condition is not met, then the computing system can continue communicating with the client system using the upgraded connection channel at block 460*a*. If the threshold condition is met, the computing system may terminate the upgraded connection and use the regular connection channel for communication with the client system at block 480*a*. If the client system still wants to connect using the upgraded connection channel, the client system may need to renegotiation with the computing system.

Figure 4B:
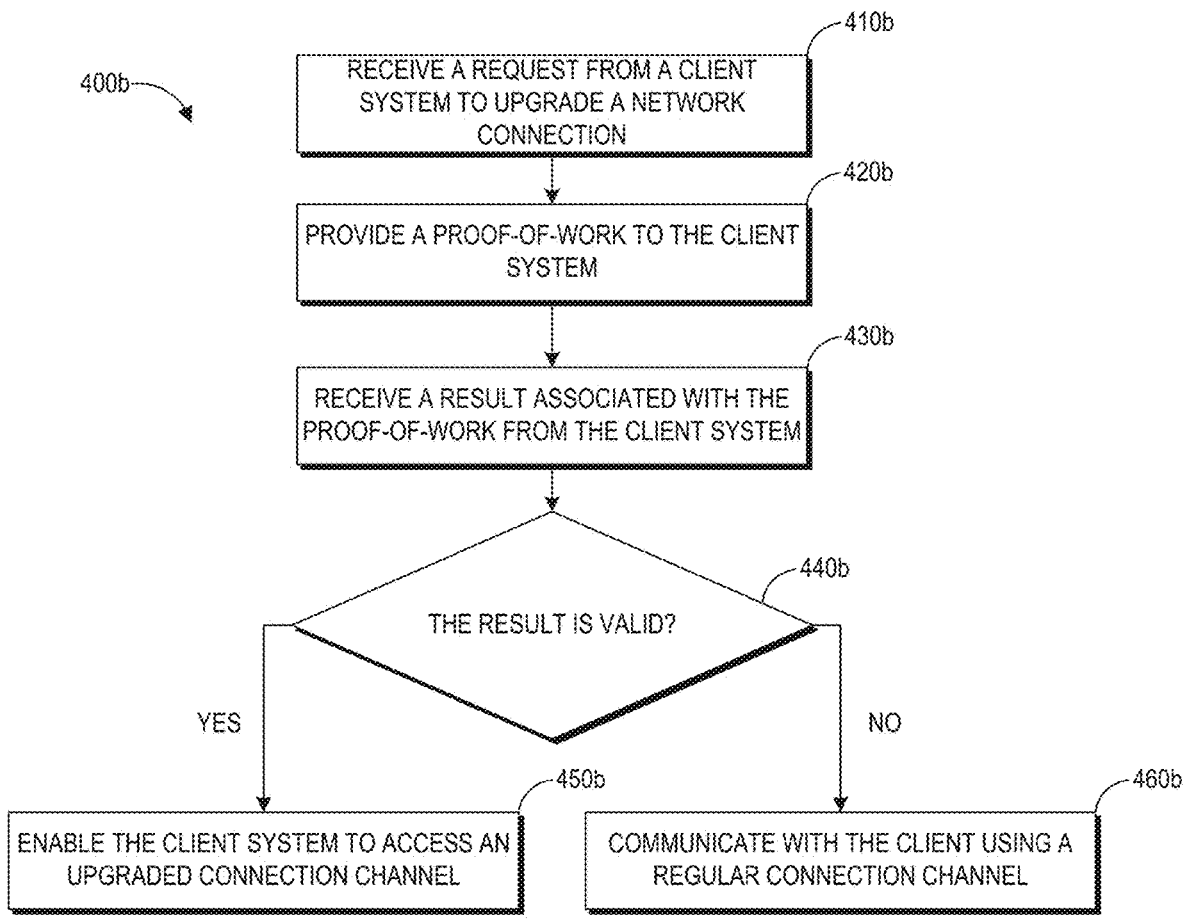
FIG. 4B depicts an example process for providing a network protocol escalation in response to a request from a client system.

FIG. 4B depicts an example process for providing a network protocol escalation in response to a request from a client system. The process 400*b* may be performed by the computing system 130 shown in FIG. 1.

At block 410*b*, the computing system can receive a request from a client system to grade a network connection. The request may be included in an HTTP header. The client system may send the request when the client system first establishes the connection with computing device. The request could also be sent in response to receiving an indication from the computing system that an upgraded connection is available.

At block 420*b*, the computing system can provide a proof-of-work to the client system 420*b*. In some embodiments, the computing system provides a service buckets menu to the client system. The client system can select a tier of service from the service buckets menu. The computing system may send the client system the proof-of-work corresponding to the selected tier of service.

At block 430*b*, the computing system can receive a result associated with the proof-of-work from the client system. For example, the result may be a solution to a math problem.

At block 440*b*, the computing system can validate the result. For example, the computing system can check whether the solution is correct. If the computing system determines that the result is valid, at block 450*b*, the computing system can enable the client system to access an upgraded connection channel. In some embodiments, the access to the upgraded connection channel is timed and the upgraded connection is terminated when the time is up. If the result is invalid, at block 460*b*, the computing system can still communicate with the client using a default connection channel, such as a regular connection channel or an upgraded connection channel associated with a lower tier of service.

Figure 5:
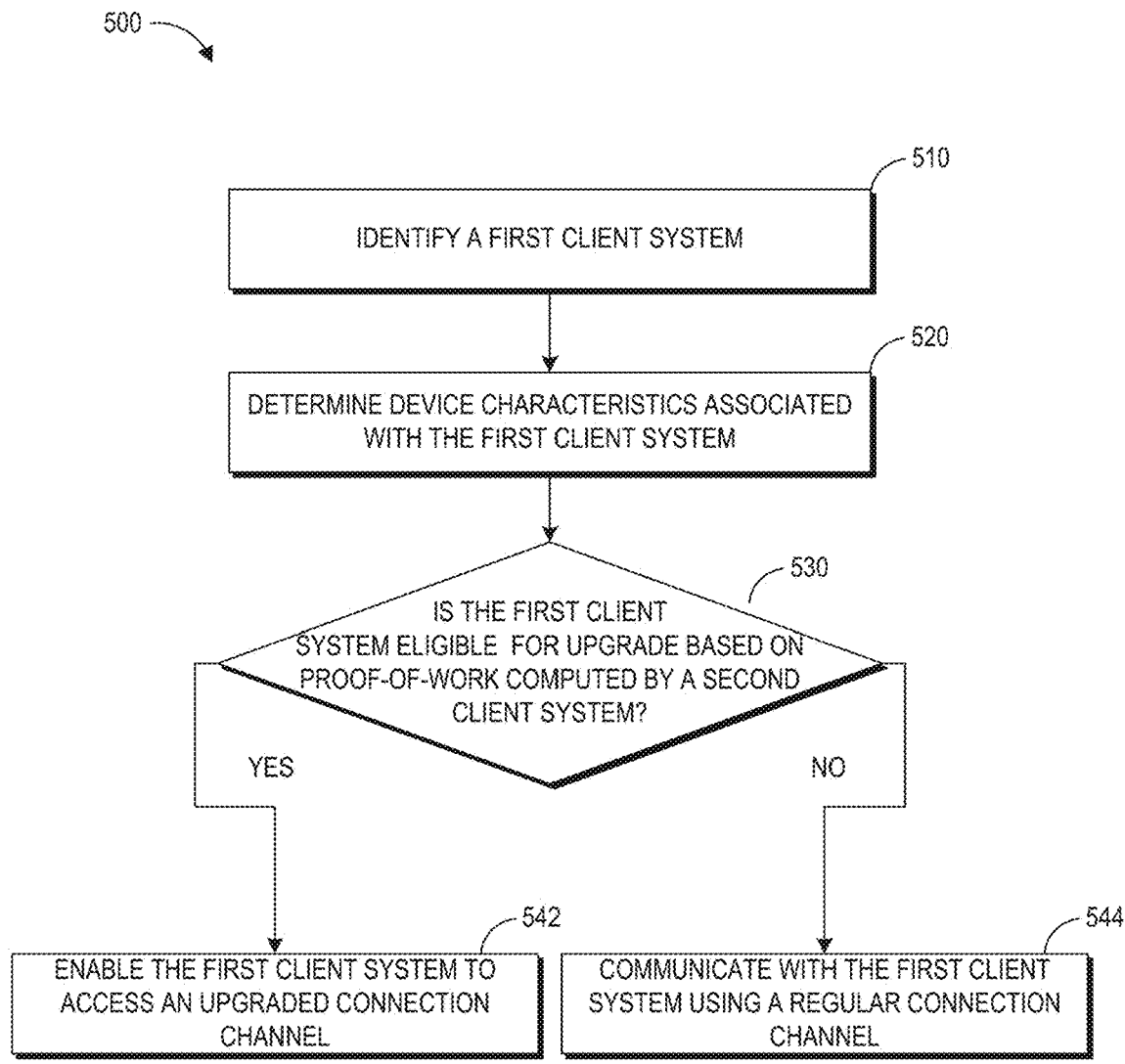
FIG. 5 illustrates an example process of providing a network protocol escalation path for a first client system based on a proof-of-work solved by a second client system.

FIG. 5 illustrates an example process of providing a network protocol escalation path for a first client system based on a proof-of-work solved by a second client system. The process 500 can be performed by the computing system 130 shown in FIG. 1.

At block 510, the computing system 130 can identify a first client system. The first client system can be identified when the computing system 130 receives a request from the client system to upgrade its connection. The computing system 130 can also automatically identify the first client system (without receiving the request to upgrade). The computing system may perform sampling, for example, by using a probabilistic model or other types of rules to select the client system eligible for upgrade. For example, the computing system can look at a group of devices having similar device characteristics and randomly identify a device for the upgraded connection if at least one device in the group has solved a proof-of-work or a segment of a proof-of-work. In certain implementations, if a client device in the group completes the proof-of-work, the entire group may be eligible for the upgraded connection channel. Additionally or alternatively, the computing system can determine whether the first client system has similar characteristics as devices that are on a blacklist. As an example, the computing system may deny the first client system's upgrade request in response to a determination that the first client system's IP address indicates a location associated with some of the blacklisted devices. The system may also deny a plurality of second systems' upgrade requests without even determining whether the second systems can compute a proof-of-work, where those systems are similar in some way to the first client system, which has been denied an upgrade request. The similarity used to group the second systems with the first to deny all requests can include similarity based on location (e.g., as identified by IP address), device type, or the like. For instance, if one misbehaving device from a certain country is denied an upgrade, other devices from that area may be (at least temporarily) denied an upgrade.

At block 520, the computing system can determine device characteristics associated with a first client system. Various device profiling techniques can be used to determine the device characteristics. For example, the computing system can extract one or more device characteristics based on the header of a user agent on the first client system or extract the IP address associated with the first client system. In certain implementations, the block 520 can be performed before the block 510 or may be optional. For example, the computing system can determine a group of client systems having similar device characteristics and select the first client system from the group of client systems.

At block 530, the computing system can determine whether the first client system is eligible for an upgraded connection channel. The computing system can determine whether the first client system has similar characteristics as a second client system which has solved at least a portion of a proof(s)-of-work. For example, the computing system can determine whether the first client system has an IP address from a block of similar IP addresses (such as, e.g., the same subnet or location) as the second client system. The computing system can also determine whether the first client system is likely an IoT device, where the first client system may have a lower likelihood to be found eligible if the first client system is an IoT device.

If the computing system determines that the first client system is eligible for the upgraded connection channel, at block 542, the computing system can enable the first client system to access the upgraded connection channel. In some situations, the computing system may provide an indication (e.g., via a header in the HTTP communication) to the first client system informing the first client system that the upgraded connection channel is available. The computing system can also automatically enable access to the upgraded connection channel by the client system. In certain implementations, the upgraded connection for the first client system may be tied to the second client system. For example, where multiple tiers of services are offered, the tier of connection provided to the first client system may be lower than or equal to the tier of which the second client system is eligible. As another example, the duration of the upgraded connection for the first client system may be shorter than or equal to that of the second client system. The computing system may later require the first client system to solve proof(s)-of-work to keep the access to the upgraded connection channel even though proofs-of-work are not required for the initial access to the upgraded connection channel.

If the computing system determines that the first client system is not eligible for the upgraded connection channel, at block 544, the computing system can communicate with the first client system using a regular connection channel.

Additional Aspects

In a 1st aspect, a system for dynamically providing a network protocol escalation path, the system comprising: a network traffic monitoring system configured to: monitor network traffic associated with a plurality of computing devices configured to deliver web content; calculate a metric associated with an availability of hardware resources associated with the plurality of computing devices; in response to a determination that the calculated metric has passed a threshold condition, communicate an alert to the network connection management system that the calculated metric has passed the threshold condition; and a network connection management system configured to: in response to the alert from the network connection management system, provide an indication to a client system that a network protocol escalation path is available wherein the network protocol escalation path is associated with an upgraded connection channel; and in response to a selection by the client system to upgrade to the upgraded connection channel: receive a result of a proof-of-work from the client system; validate the result of the proof-of-work; and enable the client system to access the upgraded connection channel in response to a determination that the result of the proof-of-work is valid.

In a 2nd aspect, the system of aspect 1, wherein the plurality of computing devices comprises an edge server in a content delivery network.

In a 3rd aspect, the system of aspect 2, wherein the metric comprises a bandwidth, a throughput, or a CPU utilization of the edge server.

In a 4th aspect, the system of any one of aspects 1-3, wherein the network traffic monitoring system is further configured to detect a denial-of-service attack based on the calculated metric.

In a 5th aspect, the system of any one of aspects 1-4, wherein the proof-of-work is associated with a value and wherein the value is calculated based at least in part on the cost of providing the upgraded connection channel to the client system.

In a 6th aspect, the system of any one of aspects 1-5, wherein the network connection management system is further configured to disable an access to the upgraded connection channel in response to meeting a threshold condition for terminating the upgraded connection channel.

In a 7th aspect, the system of aspect 6, wherein the threshold condition for terminating the upgraded connection channel comprises at least one of: a drop in the network traffic or a timeout.

In an 8th aspect, the system of any one of aspects 1-7, wherein the indication to the client system that the protocol escalation path is available and the selection by the client system to upgrade to the upgraded connection channel are communicated using a Hypertext Transfer Protocol header.

In a 9th aspect, the system of any one of aspects 1-8, wherein the upgraded connection channel is implemented using an HTTP over a User Datagram Protocol.

In a 10th aspect, a method for dynamically providing a network protocol escalation path, the method comprising: receiving a request from a client system to access an upgraded connection channel; providing a plurality of available services to the client system, wherein the plurality of available services are associated with multiple types of upgraded connections; receiving a selection of a service from the client system; providing a proof-of-work associated with the desired service to the client system; receiving a result associated with the proof-of-work; determining whether the result associated with the proof-of-work is valid; and in response to a determination that the result associated with the proof-of-work is valid, establishing a connection with the client system using the upgraded connection channel.

In an 11th aspect, the method of aspect 10, wherein the request from the client system to access an upgraded connection channel is included in an HTTP header.

In a 12th aspect, the method of any one of aspects 10-11, wherein each service of the plurality of available services is associated with a proof-of-work wherein the proof-of-work is determined based on a value associated with the proof-of-work and a cost of delivering the service.

In a 13th aspect, a method for dynamically providing a network protocol escalation path, the method comprising: establishing an online session with a client system; determining whether the client system is eligible for a network protocol escalation path, wherein the network protocol escalation path comprises an upgraded connection channel; in response to a determination that the client system is eligible for the network protocol escalation path, providing a proof-of-work to the client system for processing by the client system; receiving a result associated with the proof-of-work from the client system; validating the result associated with the proof-of-work; and in response to a determination that the result associated with the proof-of-work is valid, enabling the client system to access to upgraded connection channel until a threshold condition is met.

In a 14th aspect, the method of aspect 13, wherein the upgraded connection channel comprises a larger bandwidth and is associated with a high priority.

In a 15th aspect, the method of aspect 14, wherein the online session is established using a regular connection channel which has a lower priority than the upgraded connection channel.

In a 16th aspect, the method of any one of aspect 13-15, wherein determining whether the client system is eligible for a network protocol escalation path comprises at least one of: determining a type of the client system; receiving a request from the client system to access the upgraded connection channel; or receiving an indication from the client system that it selects the upgraded connection channel in response to an indication sent the client system that the upgraded connection channel is available.

In a 17th aspect, the method of any one of aspects 13-16, wherein the proof-of-work comprises a plurality of segments and the result associated with the proof-of-work comprises a result of a segment of the plurality of segments.

In an 18th aspect, the method of any one of aspects 13-17, wherein the threshold condition comprises at least one of: a timeout or a change in a network condition.

In a 19th aspect, the method of any one of aspects 13-18, wherein the proof-of-work comprises at least a portion of a blockchain associated with a cryptocurrency.

In a 20th aspect, the method of any one of aspects 13-19, wherein the upgraded connection channel is implemented using an HTTP over a User Datagram Protocol.

In a 21st aspect, a method for dynamically providing a network protocol escalation path, the method comprising: establishing an online session with a client system using a first communication channel; identifying a network problem with the first communication channel; and in response to identifying the network problem, determining that the client system has solved a computational problem that entitles the client system to use a second communication channel, and in response to said determining, communicating with the client system over the second communication channel instead of the first communication channel.

In a 22nd aspect, the method of aspect 21, wherein said determining that the client system has solved a computational problem comprises determining that the client system has correctly solved the computational problem.

In a 23rd aspect, the method of any one of aspects 21-22, wherein the computational problem is a proof-of-work associated with a cryptocurrency.

In a 24th aspect, the method of any one of aspects 21-23, further comprising instructing the client system to solve the computational problem prior to said identifying the network problem.

In a 25th aspect, a system for dynamically providing a network protocol escalation path, the system comprising: a network traffic monitoring system configured to: monitor network traffic associated with a plurality of computing devices configured to deliver web content; calculate a metric associated with an availability of hardware resources associated with the plurality of computing devices; in response to a determination that the calculated metric has passed a threshold condition, communicate an alert to the network connection management system that the calculated metric has passed the threshold condition; and a network connection management system configured to: in response to the alert from the network connection management system, provide an indication to a client system that a network protocol escalation path is available wherein the network protocol escalation path is associated with an upgraded connection channel; and in response to a selection by the client system to upgrade to the upgraded connection channel: receive a result of a proof-of-work from the client system; validate the result of the proof-of-work; and enable the client system to access the upgraded connection channel in response to a determination that the result of the proof-of-work is valid.

In a 26th aspect, the system of aspect 25, wherein the plurality of computing devices comprises an edge server in a content delivery network.

In a 27th aspect, the system of aspect 26, wherein the metric comprises a bandwidth, a throughput, or a CPU utilization of the edge server.

In a 28th aspect, the system of any one of aspects 25-27, wherein the proof-of-work is associated with a value and wherein the value is calculated based at least in part on the cost of providing the upgraded connection channel to the client system.

In a 29th aspect, the system of any one of aspects 25-28, wherein the network connection management system is further configured to disable an access to the upgraded connection channel in response to meeting a termination condition for the upgraded connection channel.

In a 30th aspect, the system of aspect 29, wherein the termination condition comprises at least one of: a reduction in the network traffic or a timeout.

In a 31st aspect, the system of any one of aspects 25-30, wherein the indication to the client system that the protocol escalation path is available and the selection by the client system to upgrade to the upgraded connection channel are communicated using a Hypertext Transfer Protocol (HTTP) header.

In a 32nd aspect, the system of any one of aspect 25-31, wherein the upgraded connection channel is implemented using an HTTP over a User Datagram Protocol.

In a 33rd aspect, the system of any one of aspects 25-32, wherein the network connection management system is further configured to: select another client system from a group of client systems having similar device characteristics as the client system which has solved the proof-of-work; and flag the other client system as eligible for the upgraded connection channel.

In a 34th aspect, the system of aspect 33, wherein the network connection management system is configured to apply a sampling technique to the group of client systems to select the other client system.

In a 35th aspect, a method for dynamically providing a network protocol escalation path, the method comprising: communicating with a plurality of client systems with a first connection channel; determining device characteristics associated with the plurality of client systems; identifying a group of client systems within the plurality of client systems which has one or more similar device characteristics; validating a result associated with a proof-of-work solved by a first client system within the group of client systems; identifying a second client system within the group of client system eligible for a second connection channel; and providing an indication to the second client system that the second connection channel is available in response to a determination that the first client system has solved the proof-of-work.

In a 36th aspect, the method of aspect 35, wherein the indication to the second client system that the second connection channel is available is provided via an HTTP header.

In a 37th aspect, the method of aspect 35 or 36, wherein the second connection channel comprises at least one of: a larger bandwidth or a higher priority compared to the first connection channel.

In a 38th aspect, the method of any one of aspects 35-37, wherein the proof-of-work comprises a portion of a resource intensive computational problem.

In a 39th aspect, the method of any one of aspects 35-38, wherein identifying the second client system within the group of client system eligible for the second connection channel comprises applying a probabilistic model to select the second client system from the group of client system.

In a 40th aspect, the method of any one of aspects 35-39, further comprising in response to the determination that the first client system has solved the proof-of-work, providing a third connection channel to the first client system wherein the third connection channel comprises an upgraded connection which is at least the same or better than the second connection channel provided to the second client system.

In a 41st aspect, a method for dynamically providing a network protocol escalation path, the method comprising: establishing a network connection with a client system using a first connection channel; identifying a triggering event associated with the network connection; in response to the triggering event: determining that the client system is eligible for a second connection channel; and communicating to the client system that the second connection channel is available; and in response to a selection by the client system to communication via the second connection channel, communicating with the client system using the second connection channel instead of the first connection channel.

In a 42nd aspect, the method of aspect 41, wherein determining that the client system is eligible for the second connection channel comprises: providing a proof-of-work to the client system; receiving a result of the proof-of-work solved by the client system; and validating the result of the proof-of-work, wherein the client system is eligible for the second connection channel in response to a determination that the result of the proof-of-work is valid.

In a 43rd aspect, the method of aspect 42, wherein the proof-of-work comprises at least a portion of a blockchain computation.

In a 44th aspect, the method of any one of aspects 41-43, wherein determining that the client system is eligible for the second connection channel comprises: determining one or more device characteristics associated with the client system; identifying another client system having similar device characteristics; determining that the other client system has solved at least a portion of the proof-of-work; and flagging the client system as eligible for the second connection channel in response to a determination that the other client system has solved at least a portion of the proof-of-work. The method of claim 17, wherein the triggering event comprises an increase in network traffic or a request from the client system for the second connection channel.

In a 45th aspect, the method of any one of aspects 41-44, wherein the selection by the client system to communication via the second connection channel is communicated in an HTTP header.

Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, or combinations of the same or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for dynamically providing a network protocol escalation path, the system comprising:
a network traffic monitoring system configured to:
monitor network traffic associated with a plurality of computing devices configured to deliver web content;
calculate a metric associated with an availability of hardware resources associated with the plurality of computing devices;
in response to a determination that the calculated metric has passed a threshold condition, communicate an alert to a network connection management system that the calculated metric has passed the threshold condition; and the network connection management system configured to:
in response to the alert from the network traffic monitoring system, provide an indication to a first client system that a network protocol escalation path is available wherein the network protocol escalation path is associated with an upgraded connection channel;
in response to a selection by the first client system to upgrade to the upgraded connection channel:
receive a result of a proof-of-work from the first client system;
validate the result of the proof-of-work; and
enable the first client system to access the upgraded connection channel in response to a determination that the result of the proof-of-work is valid;
select a second client system from a group of client systems having at least one similar device characteristic as the first client system which has solved the proof-of-work; and
allow at least the second client system to access the upgraded connection channel without requiring that the second client system solve the proof-of-work.

2. The system of claim 1, wherein the plurality of computing devices comprises an edge server in a content delivery network.

3. The system of claim 2, wherein the metric comprises a bandwidth, a throughput, or a CPU utilization of the edge server.

4. The system of claim 1, wherein the proof-of-work is associated with a value and wherein the value is calculated based at least in part on the cost of providing the upgraded connection channel to the first client system.

5. The system of claim 1, wherein the network connection management system is further configured to disable an access to the upgraded connection channel in response to meeting a termination condition for the upgraded connection channel.

6. The system of claim 5, wherein the termination condition comprises at least one of: a reduction in the network traffic or a timeout.

7. The system of claim 1, wherein the indication to the first client system that the network protocol escalation path is available and the selection by the first client system to upgrade to the upgraded connection channel are communicated using a Hypertext Transfer Protocol (HTTP) header.

8. The system of claim 1, wherein the upgraded connection channel is implemented using an HTTP over a User Datagram Protocol.

9. The system of claim 1, wherein the network connection management system is configured to apply a sampling technique to the group of client systems to select the second client system.

10. The system of claim 1, wherein the network connection management system is further configured to, in response to the alert from the network traffic monitoring system, deny incoming network traffic on a regular connection channel that is not associated with an upgraded connection channel.

11. The system of claim 1, wherein availability of the network protocol escalation path is limited to a time duration after expiration of which access to the upgraded connection channel is disabled, and wherein the time duration is extendable in response to a determination that a result of at least one additional proof-of-work received from the first client system is valid.

12. The system of claim 1, wherein the network connection management system is further configured to:
in response to a determination that at least one device characteristic of the first client system is similar to that of one or more devices included in a list of devices that are not eligible for the upgraded connection channel, block the first client system from accessing the upgraded connection channel without validating that the first client system can solve the proof-of-work.

13. A method for dynamically providing a network protocol escalation path, the method comprising:
communicating with a plurality of client systems with a first connection channel;
determining device characteristics associated with the plurality of client systems;
identifying a group of client systems within the plurality of client systems which has one or more similar device characteristics;
validating a result associated with a proof-of-work solved by a first client system within the group of client systems;
identifying a second client system within the group of client systems eligible for a second connection channel;
providing an indication to the second client system that the second connection channel is available in response to a determination that the first client system has solved the proof-of-work and without requiring the second client system to solve the proof-of-work.

14. The method of claim 13, wherein the indication to the second client system that the second connection channel is available is provided via an HTTP header.

15. The method of claim 13, wherein the second connection channel comprises at least one of: a larger bandwidth or a higher priority compared to the first connection channel.

16. The method of claim 13, wherein the proof-of-work comprises a portion of a resource intensive computational problem.

17. The method of claim 13, wherein identifying the second client system within the group of client systems eligible for the second connection channel comprises applying a probabilistic model to select the second client system from the group of client systems.

18. The method of claim 13, further comprising in response to the determination that the first client system has solved the proof-of-work, providing a third connection channel to the first client system wherein the third connection channel comprises an upgraded connection which is at least the same or better than the second connection channel provided to the second client system.

19. A method for dynamically providing a network protocol escalation path, the method comprising:
establishing a network connection with a client system using a first connection channel;
identifying a triggering event associated with the network connection;
in response to the triggering event:
determining that the client system is eligible for a second connection channel by:
providing a proof-of-work to the client system;
receiving a result of the proof-of-work solved by the client system; and
validating the result of the proof-of-work, wherein the client system is eligible for the second connection channel in response to a determination that the result of the proof-of-work is valid; and communicating to the client system that the second connection channel is available;

in response to a selection by the client system to communicate via the second connection channel, communicating with the client system using the second connection channel instead of the first connection channel;

selecting another client system from a group of client systems having one or more similar device characteristics as the client system which has solved the proof-of-work; and communicating with at least the another client system on the second connection channel without requiring that the another client system solve the proof-of-work.

20. The method of claim 19, wherein the proof-of-work comprises at least a portion of a blockchain computation.

21. The method of claim 19, wherein determining that the client system is eligible for the second connection channel comprises:

determining one or more device characteristics associated with the client system;

identifying other client system having similar device characteristics;

determining that the other client system has solved at least a portion of the proof-of-work; and flagging the client system as eligible for the second connection channel in response to a determination that the other client system has solved at least a portion of the proof-of-work.

22. The method of claim 19, wherein the triggering event comprises an increase in network traffic or a request from the client system for the second connection channel.

23. The method of claim 19, wherein the selection by the client system to communication via the second connection channel is communicated in an HTTP header.

* * * * *